United States Patent
Joo et al.

[11] Patent Number: 5,963,552
[45] Date of Patent: Oct. 5, 1999

[54] LOW/MEDIUM SPEED MULTI-CASTING DEVICE AND METHOD

[75] Inventors: Sang-Wan Joo, Kwacheon; Dong-Hwi Seo, Seongnam, both of Rep. of Korea

[73] Assignee: SamSung Electronics Co., Ltd., Suwon, Rep. of Korea

[21] Appl. No.: 08/829,383

[22] Filed: Mar. 31, 1997

[30] Foreign Application Priority Data

Mar. 30, 1996 [KR] Rep. of Korea .......................... 96 9625

[51] Int. Cl.⁶ .................................................. H04L 12/28
[52] U.S. Cl. ........................................... 370/390; 390/395
[58] Field of Search .................................... 370/390, 395, 370/392, 398

[56] References Cited

U.S. PATENT DOCUMENTS

| | | |
|---|---|---|
| 4,740,954 | 4/1988 | Cotton et al. . |
| 5,229,991 | 7/1993 | Turner . |
| 5,271,004 | 12/1993 | Proctor et al. . |
| 5,287,530 | 2/1994 | Davis et al. ............................ 370/390 |
| 5,305,311 | 4/1994 | Lyles ....................................... 370/390 |
| 5,386,413 | 1/1995 | McAuley et al. . |
| 5,394,397 | 2/1995 | Yanagi et al. . |
| 5,398,236 | 3/1995 | Hemmady et al. . |
| 5,410,540 | 4/1995 | Aiki et al. ............................... 370/390 |
| 5,436,893 | 7/1995 | Barnett . |
| 5,440,548 | 8/1995 | Denissen ................................. 370/390 |
| 5,490,252 | 2/1996 | Macera et al. . |
| 5,583,861 | 12/1996 | Holden . |
| 5,610,914 | 3/1997 | Yamada . |

OTHER PUBLICATIONS

Jonathan S. Turner, "Design of a Broadcast Packet Switching Network", IEEE Transactions on Communication, Jun. 1988, 734–743.

*Primary Examiner*—Jeffery A. Hofsass
*Assistant Examiner*—John Pezzlo
*Attorney, Agent, or Firm*—Robert E. Bushnell, Esq.

[57] ABSTRACT

A low/medium speed subscriber multicasting device for an asynchronous mode cell, the device may be constructed with an integrated routing table on which integrated information including the multicasting routing tables necessary for each low/medium speed subscriber's link, is mapped; and a multicasting call processing unit for receiving information from a control process in a higher layer block, for mapping out the virtual path/virtual channel and port number corresponding to the multicasting copy number of a link in the integrated routing table when receiving a multicasting cell, for accessing the routing table using the multicasting copy number and link information for the multicasting cell to read virtual paths/virtual channels for each link, and for transmitting the multicasting cell to the corresponding low/medium speed subscriber's link.

5 Claims, 7 Drawing Sheets

LOW/MEDIUM SPEED MULTI-CASTING DEVICE AND METHOD

BACKGROUND OF THE INVENTION

1. Field of the Invention

This invention relates to asynchronous transfer mode (ATM) communication systems generally, and, more specifically, to multi-casting devices and processes for providing low/medium speed subscriber interfaces.

2. Description of the Related Art

Current implementations in a network using the concept of point to multi-point connection, frequently called multicasting, or alternatively, broadcasting call from this point forward, as applied to medium speed subscriber interface. Medium speed interface modules are connected to a plurality of links, which are connected to medium speed subscribers using the point to multi-point connection concept. These networks are divided into a lower layer block with a physical layer function and a higher layer block providing an asynchronous transfer mode layer function. The medium speed interface modules serve as interfaces between the higher and lower layer blocks. User interface subscriber assemblers that use routing tables containing virtual path identifier and virtual channel identifier conversion values in order to provide subscriber multicasting, are connected to asychronous transfer mode switches. Each port of the lower layer block within the medium speed interface module is connected to a plurality of links, and each of those links has a separate, discrete routing table containing virtual path identifier and virtual channel identifier conversion values that must be used for multicasting each of the ports. The medium speed interface modules bypasses multicasting cells received from the asynchronous transfer mode switch to the lower layer block and, in turn, the lower layer block performs virtual path/virtual channel conversion by using the port routing tables.

Recent efforts such as the ATM Switching Element And Method Having Independently Accessible Cell Memories of B. D. Holden, U.S. Pat. No. 5,583,861 (and repeated by B. D. Holden in his divisional U.S. Pat. No. 5,570,348), suggest construction of a switch fabric with a plurality of asynchronous transfer mode switches, and one routing table circuit for each physical connection from the switch fabric to a work station, maintaining a marked interrupt linked list for storing information about which of its virtual channels are experiencing congestion, while the Shared Buffer Memory Switch For An ATM Switching System And Its Broadcasting Control Method by K. Yamada, U.S. Pat. No. 5,610,914, suggests a scheme in which the routing information may also be extracted by a shared buffer memory controller instead of being received from a cell multiplexer, in order to simplify the configuration of the cell multiplexer and thereby improve the processing speed.

Traditionally, as noted by J. S. Turner in Packet Switch With Broadcasting Capability For ATM Networks, U.S. Pat. No. 5,229,991, one of the problems encountered in implementing the addition of broadcasting to a point-to-point switching fabric is the inordinate size of the memory required for each broadcast translator circuit and the head end as a whole. R. Barnett, in ATM Cell Switch Suitable For Multicast Switching, U.S. Pat. No. 5,436,893, suggests an ATM cell switch for multicast switching with a plurality of link controllers each connected via an input port and an output port to a dynamic crosspoint switch. Each link controller has a plurality of external data links, and is arranged to read VPI/VCI entries for each data cell received from an external link. Ostensibly, this simplifies the switch fabric by avoid the need to maintain VPI/VCI mapping tables in the switch fabric.

We have noticed that contemporary implementation of point to multipoint connection necessitates the use of multiple small memories, at a concomitant requirement of substantial board space, with the accompanying cost. Moreover, maintenance of this type of implementation incurs part supply problems. Furthermore, we have found that this type of implementation is not efficient because the number of subscriber links can not be flexibly handled.

SUMMARY OF THE INVENTION

An object of the present invention is to provide a process and device with a higher layer of a low/medium speed subscriber integrates routing tables for multicasting.

It is another object to provide a process and device able to more efficiently utilize memory.

It is still another object to provide a multicasting process and device able to flexibly handle a variable number of subscriber links.

It is yet another object to provide a multicasting process and device for managing an integrated routing table for multiple low/medium speed links.

It is still yet another object to provide a multicasting process and device able to flexibly handle a variable number of subscriber links while minimizing cell delay.

To achieve these and other objects of the present invention, a low/medium speed subscriber multicasting process and device are provided for an asynchronous mode cell. Implementation of the multicasting process and device contemplates an integrated routing table on which is mapped integrated information including the multicasting routing tables necessary for the link of each low/medium speed subscriber; and a multicasting call processing unit for receiving information from a control process in a higher layer block, for mapping the virtual path/virtual channel and port number corresponding to the multicasting copy number of a link in the integrated routing table when receiving a multicasting cell. The multicasting call processing unit accesses the routing table using the multicasting copy number and link information for the multicasting cell in order to read virtual paths/virtual channels for each link, and transmits the multicasting cell to the corresponding low/medium speed subscriber's link.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF THE PREFERRED EMBODIMENT

Figure 1:
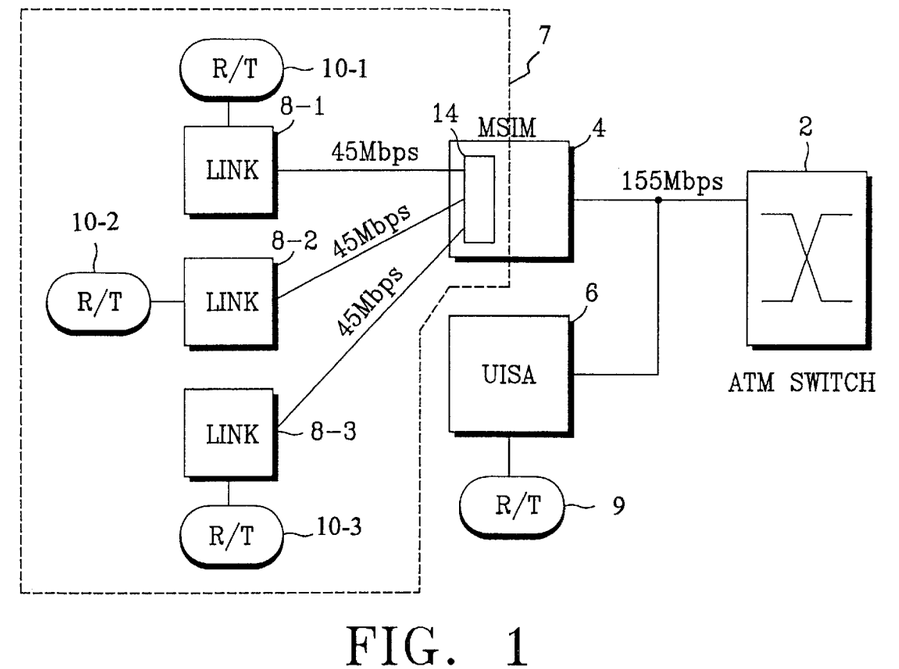
FIG. 1 is a block diagram of a hypothetical network drawn in an effort to illustrate the concept of point to multi-point connection as that concept is applied to a medium speed subscriber interface.

Turning now to the drawings, FIG. 1 is a block diagram of a network illustrating the concept of a point to multi-point connection, which is called multi-casting, or broadcast calling from this point forward, as applied to a medium speed subscriber interface. A medium speed subscriber is a subscriber who connects to the system using a 45 Mbps transmission spaced. Medium speed interface module (MSIM) 4, is shown connected to three links, 8-1, 8-2, 8-3, which are individually connected to medium speed subscribers using the point to multi-point connection concept. Links 8-1, 8-2, 8-3 are connected to a port on medium speed interface module 4. The links and medium speed interface module 4 are connected using a 45 Mbps transmission speed. If medium speed interface module 4 is replaced by a low speed interface module (LSIM), seventy-two links are connected to low speed (2.048 Mbps) subscribers. Low speed subscribers are those subscribers who connect with the system using a 2.048 Mbps transmission speed. The network illustrated by FIG. 1 is divided into a lower layer block 7 with a physical layer function, shown as surrounded by a broken line in the drawing, and the remaining higher layer block with an asynchronous transfer mode layer function. Medium speed interface module 4 interfaces the higher layer block and lower layer block 7. In the higher layer block, interfacing is performed using a 155 Mbps transmission speed, medium speed interface module 4 and user interface subscriber assembler (UISA) 6 are connected to asynchronous transfer mode switch 2. UISA 6 has routing table 9 for enabling individual subscriber multicasting. Routing table R/T 9 contains virtual path identifier/virtual channel identifier (VPI/VCI) conversion values. The higher and lower layer blocks form the point to multi-point connection. Each port of lower layer block 14 within medium speed interface module 4 is connected to links 8-1, 8-2, 8-3. Each link 8-1, 8-2, 8-3 has an individual, discrete routing table R/T 10-1, 10-2, 10-3 respectively, containing VPI/VCI conversion tables that are used for multicasting. Routing tables R/T 10-1, 10-2, 10-3 are used in multicasting of each port. When medium speed interface module 4 receives a multicasting cell from asynchronous transfer mode switch 2, medium speed interface module 4 bypasses the multicasting cell to lower layer block 7. Lower layer block 7 performs virtual path/virtual channel conversion, using the port routing tables R/T 10-1, 10-2 and 10-3.

As described above, when performing multicasting on low/medium speed subscriber modules, the links of each low/medium speed port must have routing tables that are only for multicasting. The routing tables of each port need a minimum $2^{11} \times 28$ bits; eleven bits are used for multi-cast copy number (MCN) information, and twenty-eight bits are used for VPI/VCI information. Thus, each routing table has a thirty-two kilobyte memory requirement. As shown in FIG. 1, each link contains a thirty-two kilobyte routing table. We have noticed that this implementation of point to multipoint connection necessitates the use of multiple small memories, at a concomitant requirement of substantial board space, with the accompanying cost. Moreover, maintenance of this type of implementation incurs part supply problems. Furthermore, we have found that this type of implementation is not efficient because the number of subscriber links can not be flexibly handled.

Figure 7:
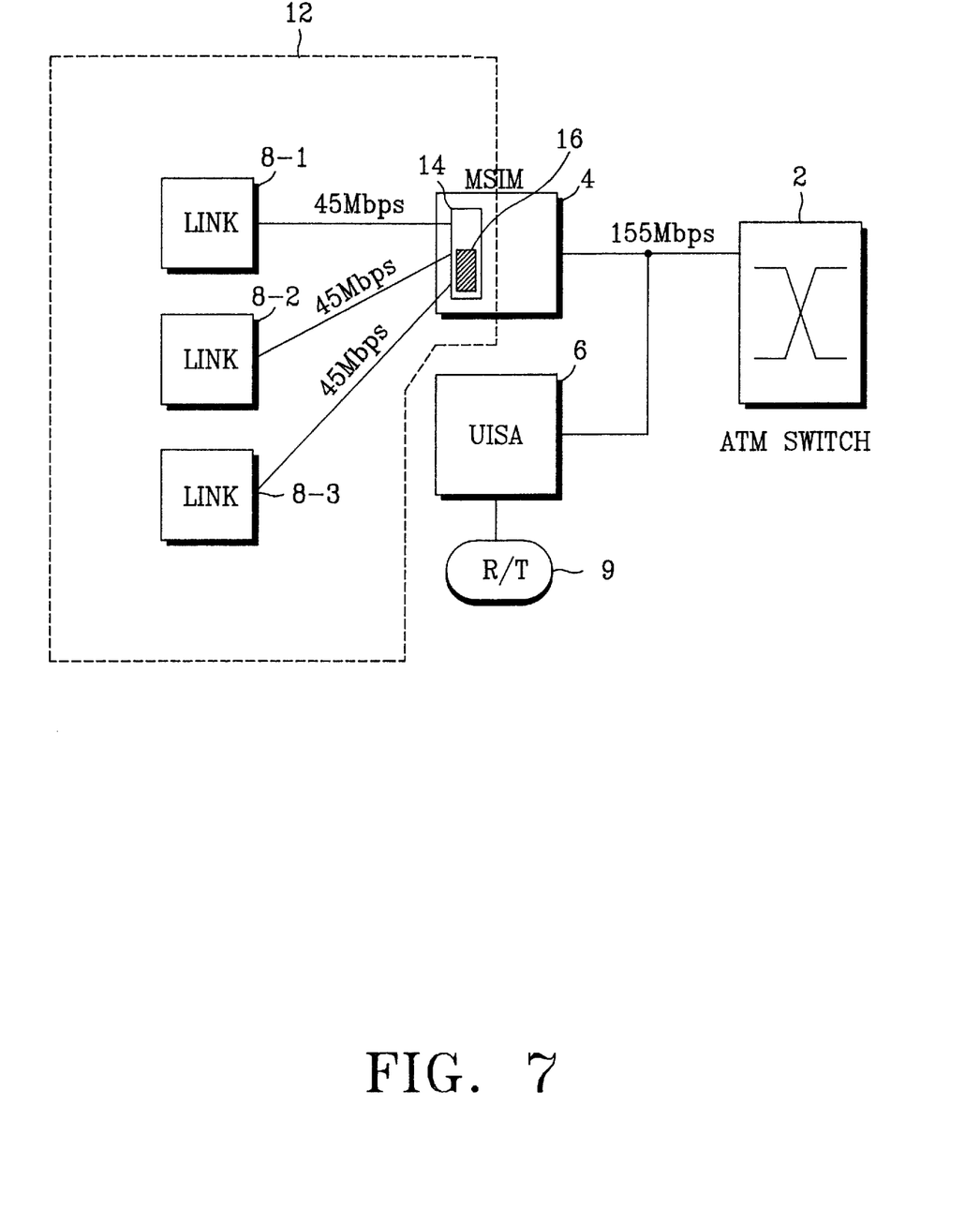
FIG. 7 is a block diagram of a medium speed subscriber interface constructed to implement the concept of point to multi-point connections in accordance with the principles of the present invention.

As shown in FIG. 7, a preferred embodiment of the present invention does not have separate routing tables 10-1 to 10-3 for each port as shown in FIG. 1, instead it has medium speed subscriber multicasting device 16 for performing a broadcast call for medium speed subscribers in lower layer block 14 within medium speed interface module 4.

Figure 8:
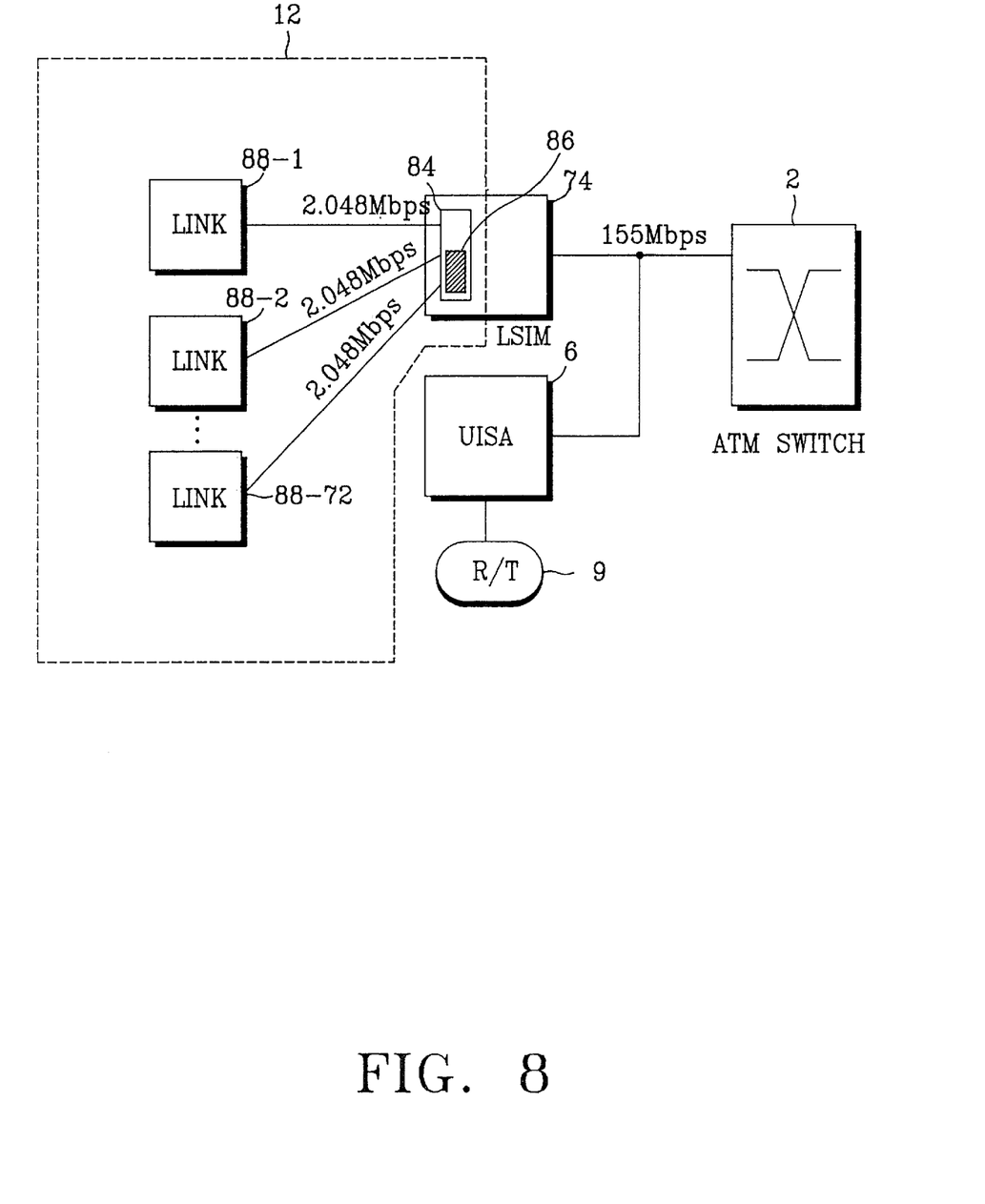
FIG. 8 is a block diagram of a low speed subscriber interface constructed to implement the concept of point to multi-point connections in accordance with the principles of the present invention.

It may be appreciated that as shown in FIG. 8, an implementation of the principles of the present invention provides a preferred embodiment that does not have seventy-two separate routing tables contained in seventy-two links, 88-1 to 88-72, which the conventional art needs for multicasting. Instead, a preferred embodiment is able to use low speed subscriber multicasting device 86, in lower layer block 84 within low speed interface module 74, for performing a broadcast call for low speed subscribers.

Figure 2:
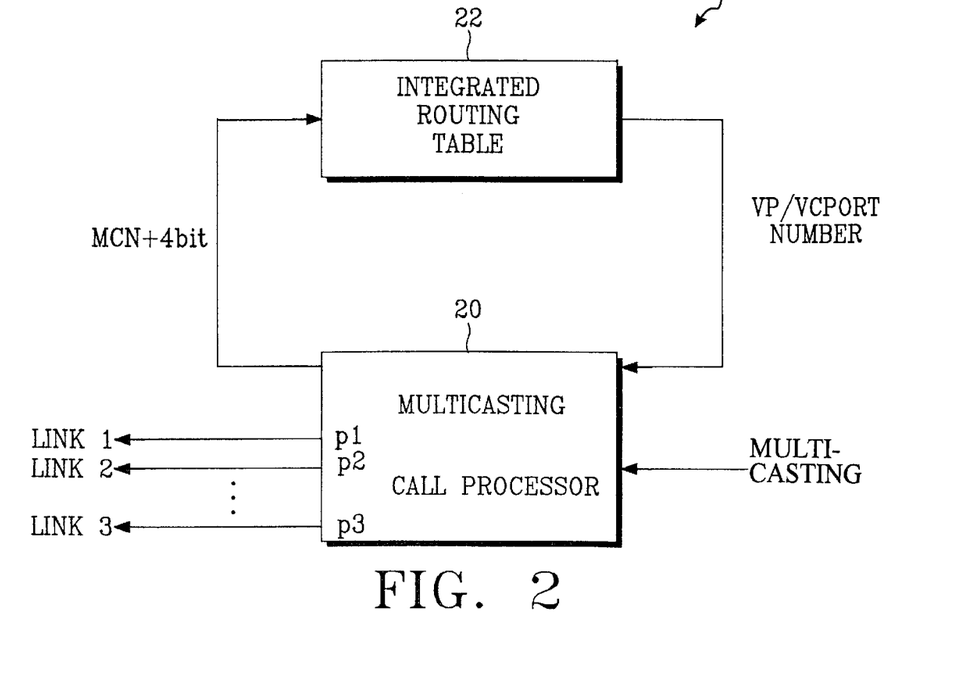
FIG. 2 is a block diagram of low/medium speed subscriber multicasting devices of the type incorporated into the circuits detailed in FIGS. 7 and 8, for implementing broadcast calls from low/medium speed subscribers, in accordance with the principles of the present invention.

FIG. 2 is a block diagram of low/medium speed subscriber multicasting devices 16 and 86, detailed in FIGS. 7 and 8. Low/medium speed subscriber multicasting devices 16 and 86 are contained by lower layer blocks 14 and 84 within medium speed interface module 4 and low speed interface module 74. The low/medium speed subscriber multicasting devices include multicasting call processor 20 and integrated routing table 22 which integrates routing tables for each links. Multicasting call processor 20 receives cells including a multicasting cell from the higher layer of medium speed interface module 4, then performs multicasting on multiple low/medium speed links 8-1 to 8-3 or 88-1 to 88-72, using integrated routing table 22. It is appropriate to utilize field programmable gate array (FPGA) logic for multicasting call processor 20.

Figure 3:
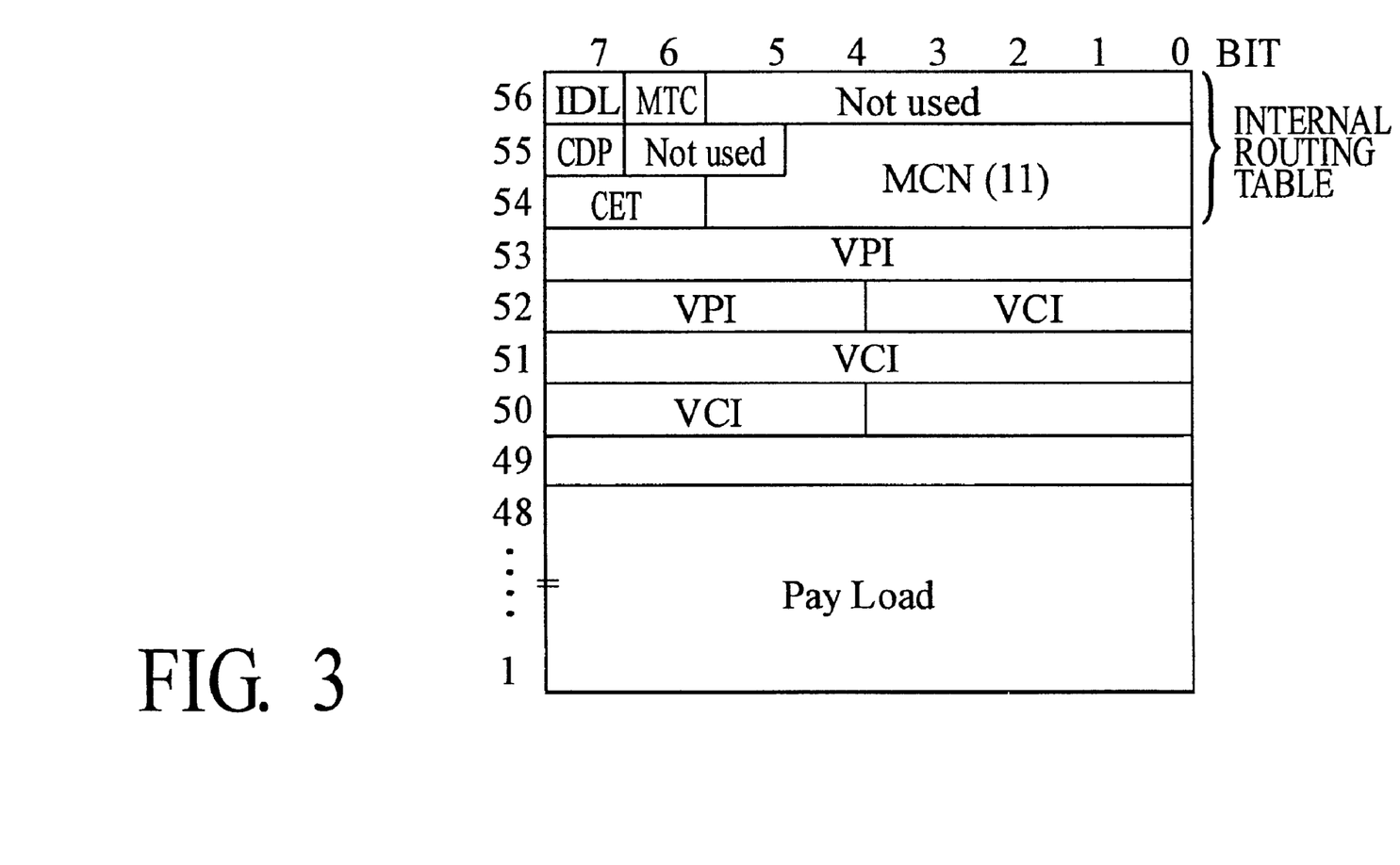
FIG. 3 illustrates the configuration of an asynchronous transfer mode cell used as a network node interface in accordance with the principles of the present invention.

FIG. 3 illustrates an ATM cell configuration used in a network node interface (NNI) according to the present invention. A standard ATM cell uses fifty-three bytes, shown as numbered 1 to 53 in FIG. 3, where a VPI/VCI field uses bytes 50 to 53 for cell routing. The remaining three bytes, 54 to 56, in addition to the fifty-three bytes forming the standard cell, are appended according to a user definition. In this appended area, MCN information, stored in eleven bits, is a field used as an index for multicasting, idle information IDL, indicates the state of idle mode, and multi-cast information MTC indicates the state of the multicasting mode. Character CDP signifies the cell delay priority ID, and CET indicates cell type ID.

Figure 4:
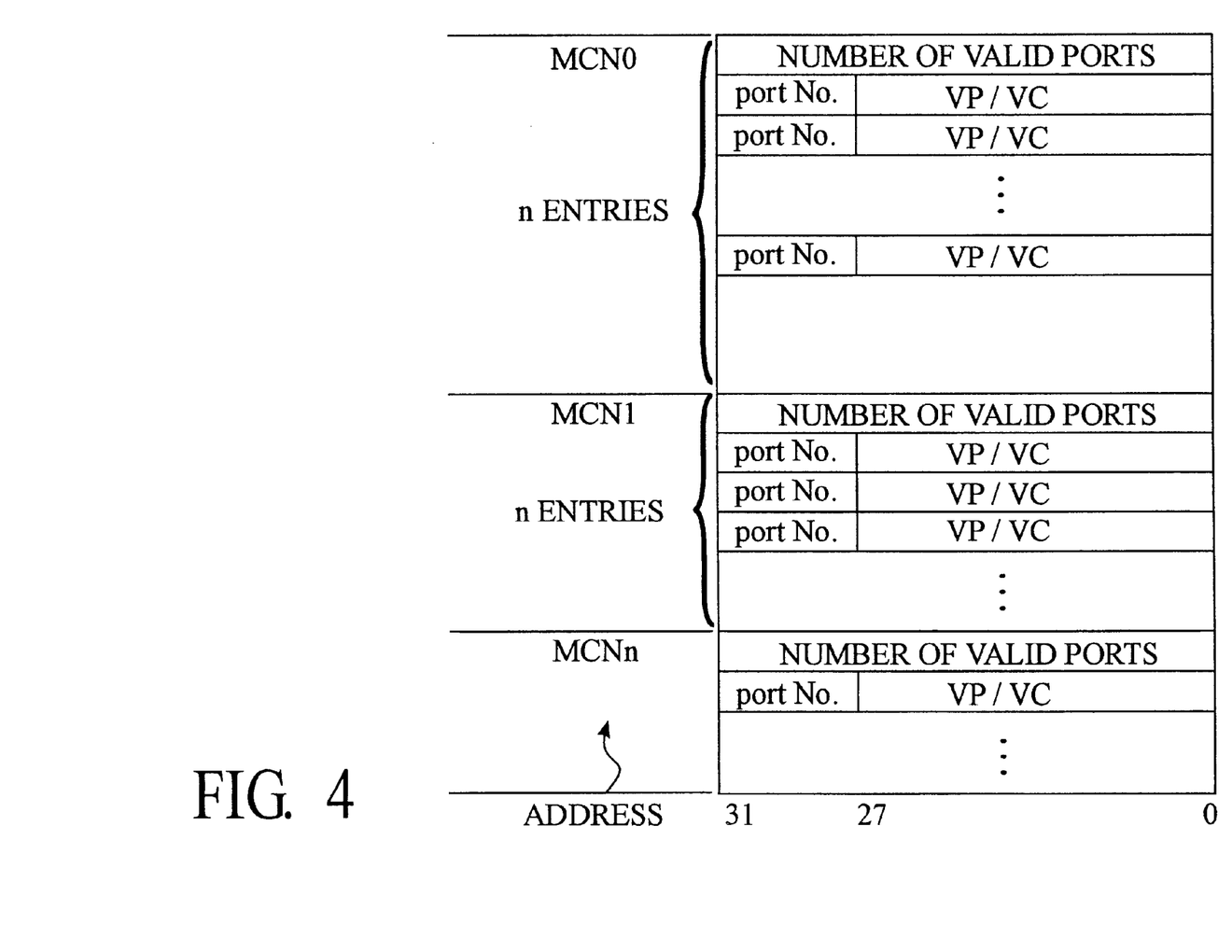
FIG. 4 illustrates a map of an integrated routing table when receiving information from an ATM system in accordance with the principles of the present invention.

When the ATM system sets up a call, cells including 11 bits MCN information as shown in FIG. 3, are supplied to multicasting call processor 20 using the operation main process (OMP), then multicasting call processor 20 maps VP/VC and port number according to the MCN information in integrated routing table 22. The information mapped on integrated routing table 22 includes all information which the conventional routing tables of each link had. Referring to FIG. 4, information on the number of available ports is stored in the area indexed by MCN address. This information includes the number of ports where multicasting must be performed when a multicasting cell is supplied. As shown in FIG. 1, the number of available ports is three when a medium speed subscriber multicasting is implemented, and seventy-two when a low speed subscriber multicasting is implemented.

When the information shown in FIG. 4 is sent to integrated routing table 22, multicasting call processor 20, shown in FIG. 2, performs a multicasting call process on medium speed subscribers as follows.

Figure 5:
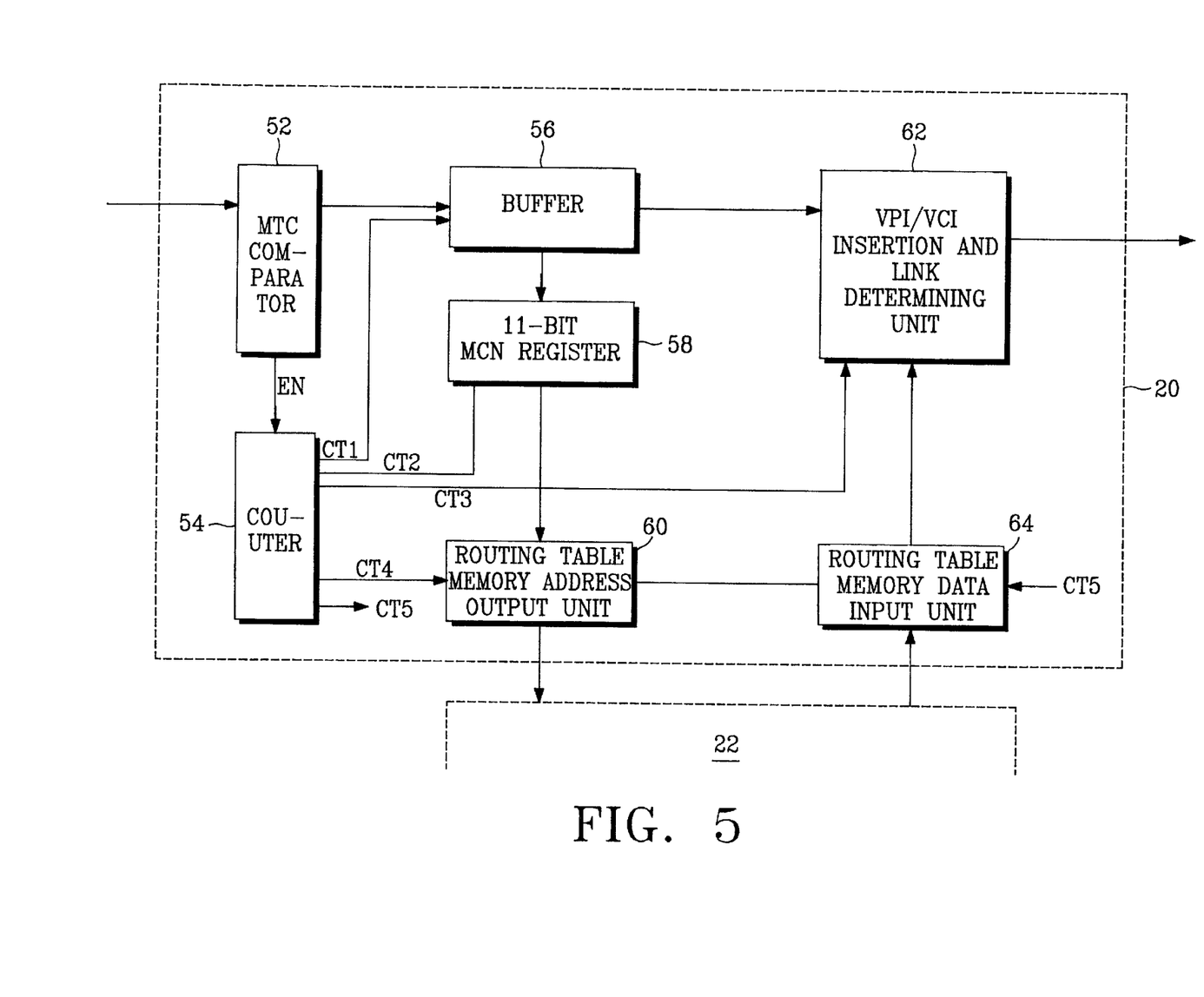
FIG. 5 is a block diagram of multicasting call processor constructed in accordance with the principles of the present invention.

As shown in FIG. 5, multicasting call processor 20 consists of MTC comparator 52, counter 54, buffer 54, eleven-bit MCN register 58, routing table memory address output unit 60, and routing table memory data input unit 64. It is appropriate to use FPGA logic for multicasting call processor 20 in the present invention.

When receiving a cell such as shown in FIG. 3, MTC comparator 52 in multicasting call processor 20, determines the MTC mode from the MTC information. When MTC has a value of "1", comparator 52 determines the cell as a multicasting cell, and it transmits enable signal EN to counter 54. The cell is sent to buffer 56 by MTC comparator 52. Counter 54 counts cell clocks by the byte to generate reference signals CT1 and CT2 for buffer 56 and eleven-bit MCN register 58. The MCN information within the cell stored in Buffer 56, is read from the cell and copied in eleven-bit MCN register 58 according to the signals CT1 and CT2, then sent to routing table memory address output unit 60. Routing table memory address output unit 60 designates read address by appending four bits that represent the port number to the MCN information transmitted from eleven-bit MCN register 58 corresponding to reference value CT4. CT4 is the result of counting the cell clocks by the byte and bit with counter 54. The read address is sent to integrated routing table 22. The read address designates the particular memory area of integrated routing table 22 to be read. The read address sequentially increases MCN+0000, MCN+0001, MCN+0002, . . . MCN+000n whenever a cell is supplied. Thus, the number of available ports is read from the memory area corresponding to the read address, and the VP/VC values of ports as many as the number of the available ports are read. The number of available ports and VP/VC values are sent to multicasting call processor 20. When the number of ports is 3, multicasting call processor 20 accesses routing table 22 three times.

Counter 54 sends reference value CT5, which is for copying the VP/VC value in the VPI/VCI field of the cell, to routing table memory data input unit 64. Routing table memory data input unit 64 reads the VP/VC value and port number from routing table 22 in response to reference value CT5, then sends the values to VPI/VCI insertion and link determining unit 62. VPI/VCI insertion and link determining unit 62 inserts the VPI/VCI value, from routing table memory data input unit 64, into the VPI/VCI field of the cell from buffer 56, determines the link (or a port) according to the value, then sends the cell to the determined link. Through the above operation, multicasting of multiple low/medium speed links in the lower layer block are completed by the higher layer block.

Figure 6:
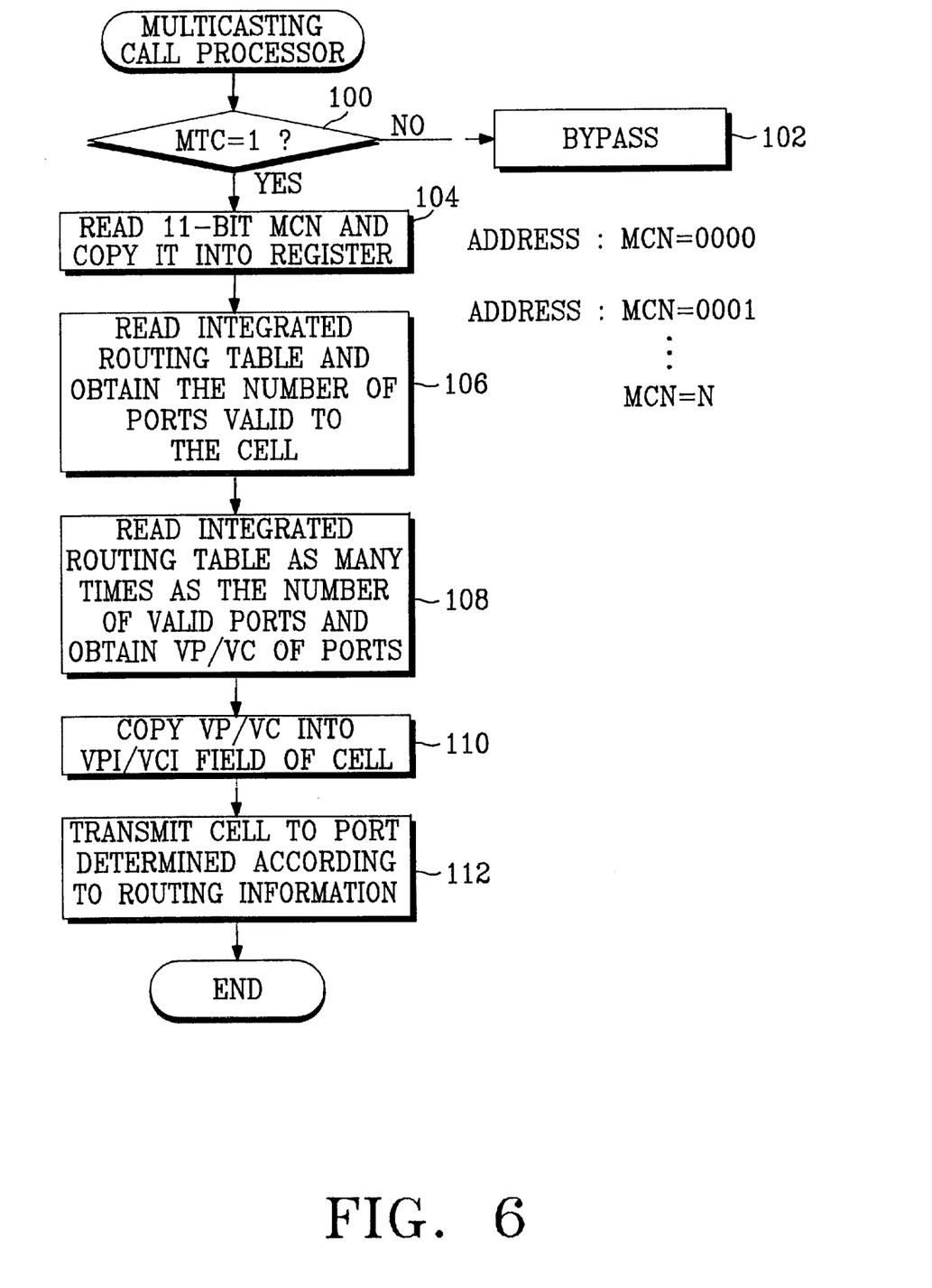
FIG. 6 is a flow chart of multicasting call processor constructed in accordance with the principles of the present invention.

Multicasting call processor 20, shown in FIG. 2 and is configured like FIG. 5, performs the following procedure. As shown in FIG. 6, multicasting call processor 20 receives a cell as shown in FIG. 3 then reads MTC field. It checks if MTC is "1" (step 100). If the MTC value is not "1", it determines the cell is not a multicasting cell, thus bypasses it to the lower layer in step 102. If the MTC value is "1", multicasting call processor 20 determines the cell is a multicasting cell, thus reads MCN information within an 11-bit MCN field in the cell to register it in a register in step 104. The cell is temporarily stored in a buffer. Multicasting call processor 20 constructs a read address by appending four bits corresponding to an available port number to the MCN field value, then accesses integrated routing table 22, using it at step 106. The number of available ports corresponding to the read address, is read from the memory area of integrated routing table 22. Multicasting call processor 20 reads integrated routing table 22 as many times as the number of the available ports to obtain the VP/VC values of the corresponding ports instep 108. The VP/VC values are registered in the VPI/VCI fields of the cell stored in the buffer (step 110). Multicasting call processor 20 transmits the cell whose routing is determined according by the VPI/VCI field values, to the corresponding port in step 112. Through the above operations, multicasting on multiple low/medium speed links in the lower layer block is completed by a higher layer block.

In this preferred embodiment of the present invention, the number of links is limited to three at the medium speed and seventy-two at the low speed, but can be changed in the practice of the present invention as necessary.

As described above, in a hierarchically structured system, the present invention integrates multicasting routing tables for multiple low/medium speed links, thereby efficiently using memory, accommodating a point to point connection, and preventing cell delay.

Therefore, it should be understood that the present invention is not limited to the particular embodiment disclosed herein as the best mode contemplated for carrying out the present invention, but rather that the present invention is not limited to the specific embodiments described in this specification except as defined in the appended claims.

What is claimed is:

1. A low/medium speed subscriber multicasting device for an asynchronous mode cell, comprising:

an integrated routing table mapping integrated information comprising multicasting routing tables for each of a plurality of links to a plurality of low/medium speed subscribers; and multicasting call processing means for receiving information from a control process in a higher layer block, for mapping a virtual path/virtual channel and a port number corresponding to a multicasting copy number for one of said plurality of links when receiving a multicasting cell, for accessing said routing table using said multicasting copy number and link information from said multicasting cell to read virtual paths/virtual channels for each of said plurality of links, and for transmitting said multicasting cell to a corresponding link assigned to one of said plurality of low/medium speed subscribers.

2. The device of claim 1, with said integrated routing table comprising a number of ports available to said cell and virtual path/virtual channel information corresponding to said ports available.

3. A low/medium speed subscriber multicasting device for an asynchronous mode cell, comprising:

an integrated routing table mapping integrated information comprising multicasting routing tables for a plurality of links for each of a plurality of low/medium subscribers;

comparison means for detecting and comparing multicasting information received from said cell to predetermined reference information, and for determining a state of a multicasting mode for said cell;

counting means for calculating said multicasting copy number extraction values, multicasting routing information inserting reference values, and reference values for transmitting an integrated routing table address and reading data, by counting read/write clocks of said cell, when said comparison means detects said multicasting mode;

buffering means for temporarily storing said cell when said comparison means detects said multicasting mode;

register means for reading and then storing a multicasting copy number from said cell stored in said buffer according to said multicasting copy number extraction value obtained from said counting means;

integrated routing table connection means for generating read addresses for accessing said integrated routing table by appending a port number to said multicasting copy number transmitted from said register means, according to said reference value for transmitting said integrated routing table address and reading data, and for reading port multicasting routing information corresponding to said read address from said integrated routing table; and multicasting routing information insertion and link determining means for inserting said port multicasting routing information into a multicasting routing information field said cell from said buffer, and for determining a link to which said cell is transmitted, using said routing information.

4. The device according to claim 3, wherein said integrated routing table includes the number of ports available to a cell and virtual path/virtual channel information corresponding to available ports.

5. A low/medium speed subscriber multicasting method for an asynchronous mode cell, comprising the steps of:

mapping a virtual path/virtual channel and a port number corresponding to a multicasting copy number of a link when information is transmitted from a control process of a higher layer block;

reading a field indicating a multicasting mode condition of a cell and determining if said cell is a multicasting cell, when said cell is received after said mapping step;

copying said multicasting copy number into a register and temporarily storing said cell in said buffer, when said cell is said multicasting cell;

accessing said integrated routing table with a read address made by appending said port number to said multicasting copy number, and reading port virtual path/virtual channel information corresponding to said read address; and inserting said port virtual path/virtual channel information into a virtual path/virtual channel information field of said cell from said buffer, and determining a link to which said cell is transmitted, using port virtual path/virtual channel information.

* * * * *